United States Patent
Berger et al.

(10) Patent No.: US 10,166,874 B2
(45) Date of Patent: Jan. 1, 2019

(54) DEVICE AND METHOD FOR POSITIONING BY MEANS OF TRIANGULATION

(71) Applicant: Bayerische Motoren Werke Aktiengesellschaft, Munich (DE)

(72) Inventors: Jens Berger, Munich (DE); Josef Krammer, Holzkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 635 days.

(21) Appl. No.: 14/615,638

(22) Filed: Feb. 6, 2015

(65) Prior Publication Data

US 2015/0151641 A1   Jun. 4, 2015

Related U.S. Application Data

(63) Continuation of application No. PCT/EP2013/065878, filed on Jul. 29, 2013.

(30) Foreign Application Priority Data

Aug. 9, 2012   (DE) .................. 10 2012 214 199

(51) Int. Cl.
*H02J 7/00*   (2006.01)
*B60L 11/18*   (2006.01)
(Continued)

(52) U.S. Cl.
CPC ......... *B60L 11/182* (2013.01); *B60L 11/1829* (2013.01); *B60L 11/1833* (2013.01);
(Continued)

(58) Field of Classification Search
CPC ..... H02J 7/025; B60L 11/182; B60L 11/1827; Y02T 10/7088
(Continued)

(56) References Cited

U.S. PATENT DOCUMENTS 8,111,141 B1   2/2012   Brand et al.
2004/0201361 A1   10/2004   Koh et al.
(Continued)

FOREIGN PATENT DOCUMENTS

CN   101414765 A   4/2009
DE   10 2007 041 783 B3   4/2009
(Continued)

OTHER PUBLICATIONS

Chinese Office Action issued in Chinese counterpart application No. 201380041760.0 dated Jan. 25, 2016, with English translation (Fifteen (15) pages).
(Continued)

*Primary Examiner* — Edward Tso
*Assistant Examiner* — Aaron Piggush
(74) *Attorney, Agent, or Firm* — Crowell & Moring LLP

(57) ABSTRACT

A system includes a vehicle and an induction charging unit, where the induction charging unit includes a primary coil and the vehicle includes a secondary coil. During a charging operation in a charging position, electric power is inductively transmissible from the primary coil to the secondary coil, in the charging position, the secondary coil being situated in a preferred spatial position area with respect to the primary coil, such that, for setting the charging position, by means of electromagnetic distance and angle measuring, by triangulation, the system detects a location position which describes a time-dependent spatial position of the secondary coil with respect to the primary coil. Moreover, by means of the location position and the charging position, the system detects at least a partial travel trajectory, along which the location position of the charging position can be approximated.

14 Claims, 3 Drawing Sheets

(51) Int. Cl.
*H02J 50/90* (2016.01)
*H02J 50/10* (2016.01)
*G05D 1/02* (2006.01)
*H02J 7/02* (2016.01)
*B62D 15/02* (2006.01)
*G01S 5/02* (2010.01)
*H02J 5/00* (2016.01)

(52) U.S. Cl.
CPC ...... *B60L 11/1846* (2013.01); *B62D 15/0285* (2013.01); *G01S 5/02* (2013.01); *G05D 1/028* (2013.01); *G05D 1/0225* (2013.01); *H02J 5/005* (2013.01); *H02J 7/025* (2013.01); *H02J 50/10* (2016.02); *H02J 50/90* (2016.02); *B60L 2230/16* (2013.01); *B60L 2240/32* (2013.01); *B60L 2240/62* (2013.01); *G05D 2201/0213* (2013.01); *Y02T 10/7005* (2013.01); *Y02T 10/7088* (2013.01); *Y02T 10/7291* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y02T 90/169* (2013.01); *Y04S 30/14* (2013.01)

(58) Field of Classification Search
USPC .......................................... 320/104, 108, 109
See application file for complete search history.

(56) References Cited

U.S. PATENT DOCUMENTS

| | | |
|---|---|---|
| 2008/0129477 A1 | 6/2008 | Takahashi et al. |
| 2009/0085522 A1 | 4/2009 | Matsumoto |
| 2011/0254503 A1* | 10/2011 | Widmer ................ B60L 11/182 |
| | | 320/108 |
| 2012/0095617 A1 | 4/2012 | Martin |
| 2012/0098483 A1 | 4/2012 | Patel |

FOREIGN PATENT DOCUMENTS

| | | |
|---|---|---|
| DE | 10 2008 055 881 A1 | 5/2010 |
| EP | 0 982 832 A2 | 3/2000 |
| EP | 0 984 123 A2 | 3/2000 |
| EP | 2 338 704 A1 | 6/2011 |
| JP | 8-280139 A | 10/1996 |
| JP | 2010-183804 A | 8/2010 |
| WO | WO 2009/109575 A1 | 9/2009 |
| WO | WO 2011/006884 A2 | 1/2011 |
| WO | WO 2011/127455 A2 | 10/2011 |
| WO | WO 2012/082858 A1 | 6/2012 |

OTHER PUBLICATIONS

International Search Report dated May 14, 2014 (Three (3) pages).
German Search Report dated Dec. 3, 2012, with Statement of Relevancy (Six (6) pages).

* cited by examiner

(12) United States Patent
US 10,166,874 B2

DEVICE AND METHOD FOR POSITIONING BY MEANS OF TRIANGULATION

CROSS REFERENCE TO RELATED APPLICATIONS

This application is a continuation of PCT International Application No. PCT/EP2013/065878, filed Jul. 29, 2013, which claims priority under 35 U.S.C. § 119 from German Patent Application No. 10 2012 214 199.5, filed Aug. 9, 2012, the entire disclosures of which are herein expressly incorporated by reference.

BACKGROUND AND SUMMARY OF THE INVENTION

The invention relates to a system comprising a vehicle and an induction charging unit, the induction charging unit having a primary coil and the vehicle having a secondary coil and, during a charging operation and in a charging position, electric power being inductively transmissible from the primary coil to the secondary coil, in the charging position, the secondary coil being situated in a preferred spatial position area with respect to the primary coil.

Vehicles having an electrified drive train usually have a charging interface to an external charging source. The transmission of electric power in order to, for example, charge an electro-chemical energy accumulator of the vehicle, usually takes place in a wired or inductive manner.

In the case of wired charging methods, the vehicle has to be connected by way of a charging cable with the external charging source, such as a charging station, in order to carry out a charging operation. In the case of inductive charging methods, the power transfer takes place by way of an electromagnetic exciter field of a vehicle-external primary coil to a vehicle-side secondary coil by way of electromagnetic induction at the secondary coil. The transmission efficiency of the electric power in this case is a function of the relative spatial position of the secondary coil with respect to the primary coil. In a preferred position area of the secondary coil relative to the primary coil, the fraction of the exciter power, which occurs as a power loss during the charging, is approximately minimal.

Bringing the secondary coil into the charging position is the object of the state of the art. International Patent Document WO 2011/006884 A2, for example, describes an electronic positioning aid for a vehicle having a primary coil, which positioning aid utilizes the reflection characteristics of a housing of the primary coil situated on the ground.

It is an object of the present invention to describe an improved system which comprises a vehicle and an induction charging unit, the induction charging unit having a primary coil and the vehicle having a secondary coil and, during a charging operation in a charging position, electric power being inductively transmissible from the primary coil to the secondary coil, in which case, in the charging position, the secondary coil is in a preferred spatial position area with respect to the primary coil.

Advantageous embodiments and further developments of the invention are indicated in the dependent claims.

According to the invention, the system for adjusting the charging position by an electromagnetic distance and angle measuring by means of triangulation detects a location position, which describes a time-dependent spatial position of the secondary coil with respect to the primary coil, and, by means of the location position and the charging position, the system detects at least a partial travel trajectory, along which the location position of the charging position can be approximated.

In the charging position, the secondary coil is situated with respect to the primary coil in a spatial position that is preferred in such a manner that, in this position, the efficiency of the electric power transmitted between the two coils is approximately maximal.

According to a preferred embodiment of the invention, the vehicle has at least two low-frequency receiving antennas and the induction charging unit has at least two low-frequency transmitting antennas for the electromagnetic distance and angle measuring.

According to an alternative embodiment, the vehicle has at least one low-frequency receiving antenna and the induction charging unit has at least two low-frequency transmitting antennas for the electromagnetic distance and angle measuring.

According to a further alternative embodiment, the vehicle has at least two low-frequency receiving antennas and the induction charging unit has at least one low-frequency transmitting antenna for the electromagnetic distance and angle measuring.

This means that, on the vehicle side, at least one low-frequency receiving antenna and, externally of the vehicle, at least one low-frequency transmitting antenna is situated, the total number of low-frequency antennas of the system for the distance and angle measuring amounting to at least three.

Furthermore, the vehicle has a charging control device, the charging control device comprising a first high-frequency communication unit, and the charging control device being assigned to the at least one receiving antenna of the vehicle as a measuring unit for the electromagnetic distance and angle measuring, and measuring induction signals of the at least one receiving antenna.

Furthermore, the induction charging unit has an induction control device, the induction control device comprising a second high-frequency communication unit, and the induction control device driving the at least one transmitting antenna. This means that the at least one transmitting antenna is operated by the induction control device.

According to another embodiment of the invention, the vehicle has at least two low-frequency transmitting antennas and the induction charging unit has at least two low-frequency receiving antennas for the electromagnetic distance and angle measuring.

As an alternative to this embodiment, the vehicle has at least one low-frequency transmitting antenna and the induction charging unit has at least two low-frequency receiving antennas for the electromagnetic distance and angle measuring.

According to a further alternative of the invention, the vehicle has at least two low-frequency transmitting antennas and the induction charging unit has at least one low-frequency receiving antenna for the electromagnetic distance and angle measuring.

This means that, according to this embodiment, on the vehicle side, at least one low-frequency transmitting antenna and, externally of the vehicle, in the area of the charging unit, at least one low-frequency receiving antenna is situated, the total number of low-frequency antennas for the distance and angle measuring amounting to at least three.

Furthermore, the vehicle has a charging control device, the charging control device driving at least one transmitting antenna, and the charging control device comprising a first high-frequency communication unit.

In addition, the induction charging unit has an induction control device, the induction control device comprising a second high-frequency communication unit, and the induction control device being assigned to the at least one receiving antenna as a measuring unit for the electromagnetic distance and angle measuring, and measuring induction signals of the at least one receiving antenna.

According to a particularly preferred embodiment of the invention, the measured induction signals can be transmitted between the induction control device and the charging control device, and the charging control device or the induction control device, as the arithmetic unit, detects, by means of induction signals, which are measured, outputted and transmitted to the arithmetic unit, the location position by triangulation.

The measured induction signals are therefore used as input variable for calculating the location position by means of triangulation.

Furthermore, by means of the calculated location position, the charging control device or the induction control device or a further control device of the vehicle detects a travel trajectory, and the vehicle automatically carries out a driving maneuver corresponding to the travel trajectory, or the vehicle informs a driver of the vehicle by way of a suitable human-machine interface concerning a driving maneuver corresponding to the travel trajectory.

The establishing of the charging position takes place in that first one of the two high-frequency communication units sends a coded search signal to the other of the two high-frequency communication units, and the other high-frequency communication unit receives the search signal and sends a coded confirmation signal back to the high-frequency communication unit. The reception of the confirmation signal triggers an initialization routine between the at least one transmitting antenna and the at least one receiving antenna, which is carried out by the charging control device and by the induction control device. After the initialization routine, the at least one transmitting antenna emits a coded electromagnetic positioning signal, in which case, with respect to the spatial dimension of the transmitting antenna, the magnetic fraction of the positioning signal has a defined field orientation and a defined field intensity. At least one receiving antenna receives the at least one positioning signal of the at least one transmitting antenna, and the charging control device or the induction control device measures a magnetic field vector for the at least one positioning signal, which magnetic field vector is unambiguously assigned to the at least one transmitting antenna by means of the coding of the position signal. The measured magnetic field is transmitted from the induction control device to the charging control device or from the charging control device to the induction control device. According to the triangulation method, the charging control device or the induction control device calculates the local position of the at least one transmitting antenna with respect to the at least one receiving antenna. The calculated location position is used as the input variable for the detection of the travel trajectory by the charging control device, by the induction control device or by an additional control device of the vehicle, along which the location position of the charging position can be approximated.

The steps of this method, which are used for detecting the location position, are repeated in real time during a driving maneuver of the vehicle in order to update the calculation of the location position and of the travel trajectory. When the charging position has been reached, the updated travel trajectory will describe a stopping maneuver. During a stopping maneuver, the vehicle comes to a stop.

An iterative method is thereby described by which the charging position can be taken up, in that alternately and in real time a driving maneuver follows the calculation of the travel trajectory and vice-versa, so that, in the case of several driving maneuvers, the charging position can be reached according to the travel trajectory calculated in an updated manner.

For carrying out a driving maneuver, the driver is assisted by way of a human-machine interface by emitted instructions (for example, "steer left") or the trajectory is used as an input variable for a drive assistance system which automatically moves the vehicle into the charging position.

The invention is based on the considerations presented in the following:

In a plurality of applications, it is the goal to determine the distance of an object (for example, a vehicle) with respect to another object (for example, a vehicle key). Radio technology in the high-frequency and low-frequency band here offers possibilities to do so in a wireless manner by means of measuring field intensities and run-times of electromagnetic alternating fields. One example are modern locking systems of vehicles, such as a keyless access, in the case of which the vehicle acts as a transmitter and the vehicle key acts as a receiver.

In this case, it is a disadvantage that, for more extensive applications, a mere distance determination between the vehicle and a vehicle-external object is not sufficient. A more extensive application is particularly the precise positioning of a vehicle having an electrified drive train and an inductive charging system in a position area that requires a spatial dimension in any spatial direction of approximately less than 10 centimeters.

A vehicle having an inductive charging system has a vehicle-side charging coil, which is also called a secondary coil and which takes over the function of a receiver coil. The primary coil acts as a transmitter coil and is part of a vehicle-external charging infrastructure. The two coils are called charging coils. For charging an energy accumulator of the vehicle, the two coils are to be mutually spatially brought into a precise position with respect to one another in order to ensure an energy transfer that is as efficient as possible during the charging. This position is called a charging position and, as described above, requires a spatial tolerance of maximally 10 centimeters.

For the spatial positioning of the charging coils relative to one another, i.e. for the positioning of the vehicle relative to the vehicle-external charging infrastructure, it is suggested to either use at least two electromagnetic signals that can be unambiguously identified in order to determine several signals at a receiver and therefore routes of at least two different transmitter positions or to use, on at least two receivers, a signal of one transmitter and therefore two routes with respect to a transmitter position for distance and angle measuring. By means of triangulation, a conclusion can clearly be drawn about the position of the receiver or the receivers with respect to the transmitter or transmitters. By way of the same radio system, in addition, communication signals, which describe, for example, position data can be exchanged on the same frequency or another frequency between the transmitter and the receiver.

As a result, an unambiguous position determination and position guidance of the vehicle with respect to the charging infrastructure within the required tolerance becomes possible for an optimal energy transmission efficiency during inductive charging. The position guidance can take place in an automated manner by the vehicle itself or by driving instructions to the driver of the vehicle.

In the following, preferred embodiments of the invention will be described by means of the attached drawings.

The latter contain further details, preferred embodiments and further developments of the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
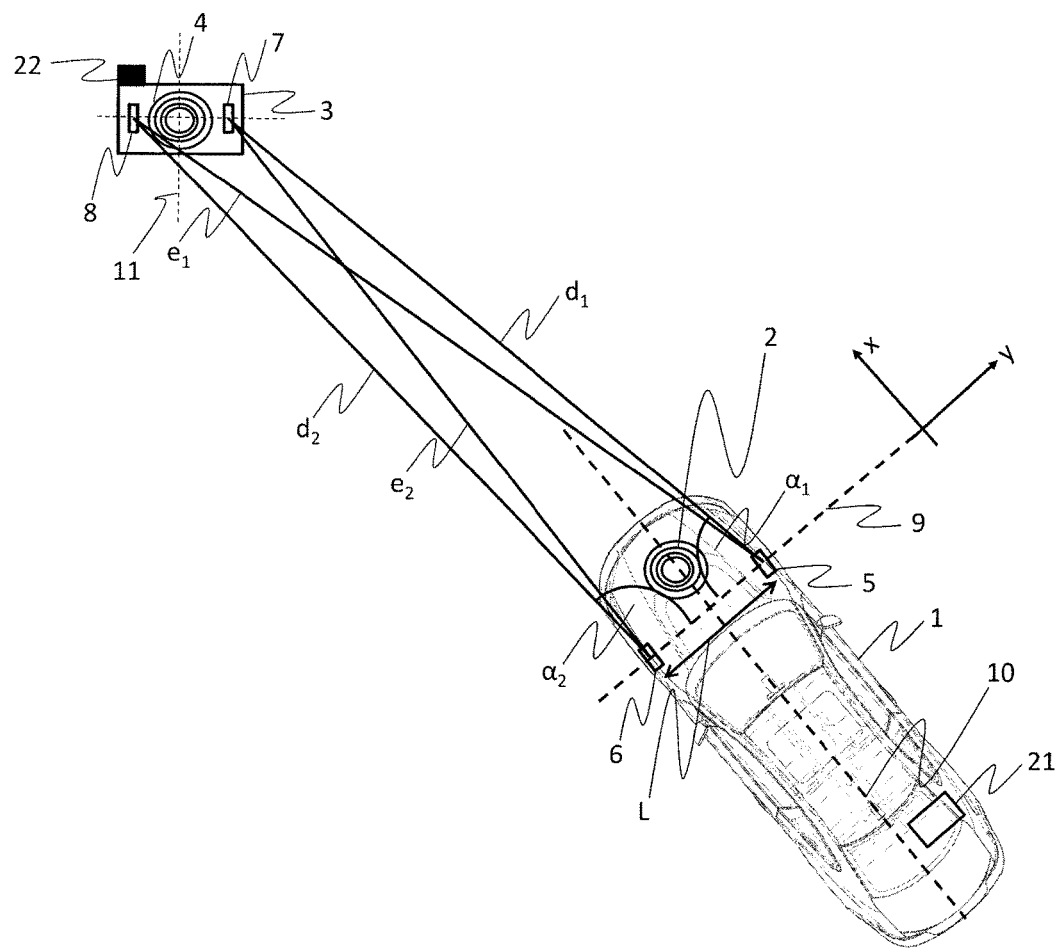
FIG. 1 is a schematic view of the positioning by triangulation with two transmitters at a charging unit and two receivers at a vehicle.

In the figures, identical reference numbers describe the same technical characteristics. A vehicle having an electrified drive train can be charged at an inductive charging station in a wireless manner. In the embodiment, a vehicle 1 having an electrified drive train is shown schematically. This may be a hybrid or electric vehicle, possibly also a plug-in hybrid vehicle, if the latter, in addition to an interface for the wireless charging, also has a charging interface for inductive charging. The vehicle comprises a vehicle-side charging architecture for wireless inductive charging, the charging architecture having a secondary coil 2 as a central vehicle-side component. In addition, the vehicle has a charging control device.

A charging unit 3 for the inductive charging of a vehicle with an electrified drive train is situated outside the vehicle. The main component of the charging unit is a primary coil 4. The charging unit may be suitable for charging a plurality of vehicles, in which case, only a single vehicle can be charged at the primary coil at a certain point in time. The primary coil is mechanically fixedly integrated in the charging unit. The charging station is stationarily situated in or on the ground. In addition, the charging unit has an induction control device.

A charging operation is any time period between an initialization operation of the charging connection and a termination operation of the charging connection. The charging operation comprises particularly those points in time at which electric power is transmitted or at least can be transmitted from the primary coil to the secondary coil.

It is a prerequisite for a charging operation that the secondary coil is in the charging position, i.e. is situated within a defined spatial area relative to the primary coil. This spatial area is characterized such that a specified geometrical reference point of the secondary coil, which is a function of the configuration of the secondary coil, deviates from a specified geometrical reference point of the primary coil, which is a function of the configuration of the primary coil, with respect to the three spatial directions, which forms the vehicle-related coordinate system known to the person skilled in the art, only up to a specified tolerance dimension for each of the three spatial directions.

When the reference point of the secondary coil relative to the reference point of the primary coil is situated such that the distance between these two reference points relative to each of the three spatial directions does not exceed the tolerance dimension specified for the respective axis, the secondary coil will be in the charging position. Because of the fact that the secondary coil is mechanically fixedly situated at the vehicle or is integrated in the vehicle, if the secondary coil is in the charging position, the vehicle will also be in a vehicle charging position. Since, within the scope of this document, with respect to its technical effect, the vehicle charging position is synonymous with the charging position, in a simplifying manner, the term "charging position" also applies to the vehicle charging position.

In order to initialize a charging operation, it is therefore necessary to bring the vehicle into the charging position. In the described embodiments, this takes place by a movement of the vehicle. In this case, it is essential to determine the position of the vehicle and thus the position of the secondary coil relative to the charging unit and therefore to the primary coil. In the embodiments, this takes place by distance and angle measuring by means of the triangulation method. The measuring is based on the acquisition of the magnetic field vector of a defined electromagnetic field generated by means of an antenna. If the antenna is further developed as a one-dimensional antenna, the received magnetic field vector is acquired at the location of the receiver as a one-dimensional vector, i.e. as a scalar.

A first and a second embodiment will be described by means of FIGS. 1, 2 and 3. In this case, two transmitting antennas and two receiving antennas are used. The two transmitting antennas are operated by a first control device, and the two receiving antennas are operated by a second control device. According to the first embodiment in FIG. 1, the two transmitting antennas and the first control device may be included in the charging unit, and the two receiving antennas and the second control device may be included in the vehicle. Accordingly, the first control device in the first embodiment is the induction control device, and the second control device is the charging control device.

Figure 2:
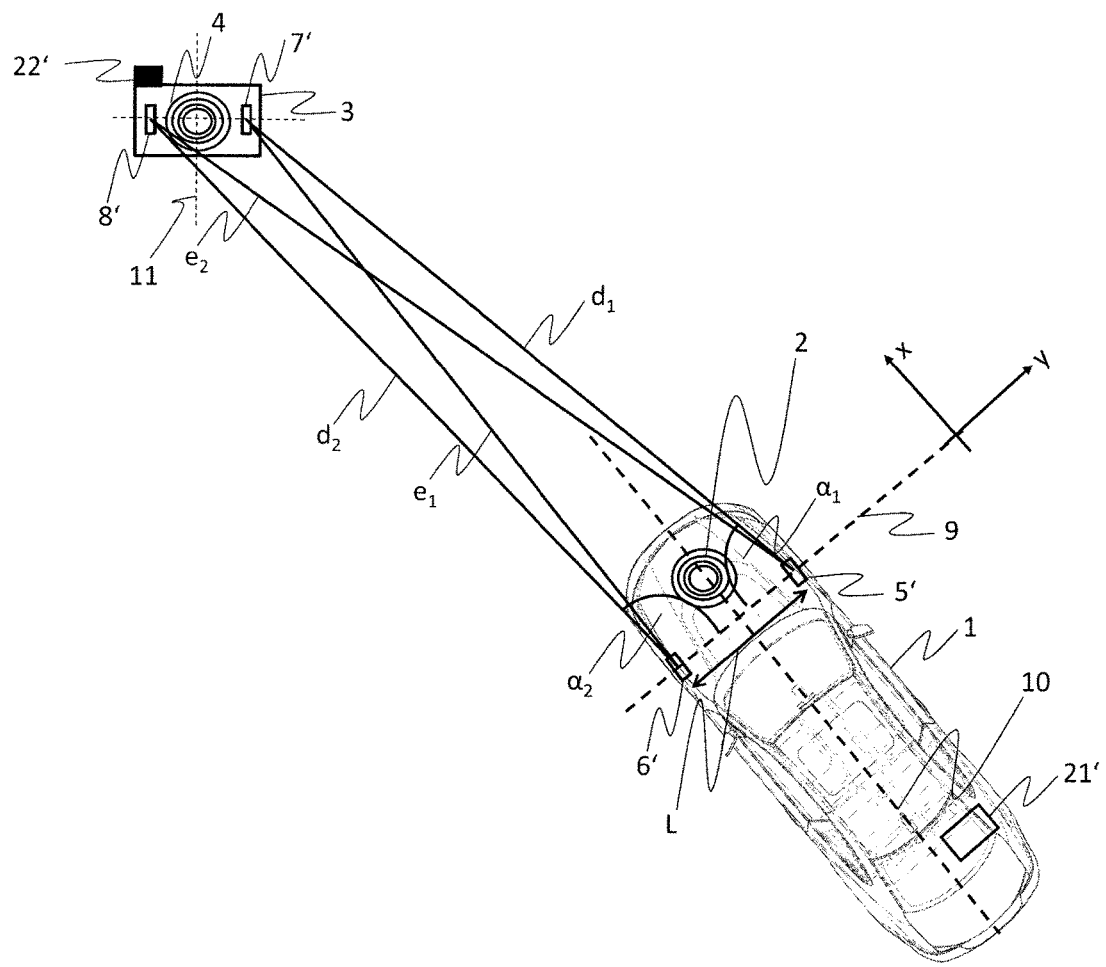
FIG. 2 is a schematic view of the positioning by triangulation with two transmitters at a vehicle and two receivers at a charging unit.

As an alternative, according to a second embodiment in FIG. 2, the two transmitting antennas 5', 6 and the first control device 21' may be included in the vehicle, and the two receiving antennas 7', 8' and the second control device 22' may be included in the charging unit. In this embodiment, the first control device is the charging control device, and the second control device is the induction control device.

According to the first and the second embodiment, preferably the transmitting antennas, also called "transmitters", are low-frequency antennas, and the receiving antennas, called "receivers", preferably are low-frequency receivers. The transmitters and the receivers operate in a frequency range of below 150 kHz, a preferred frequency band being approximately 125 kHz, with no limitation of generality.

By means of FIG. 1, the first embodiment describes the location determination of the vehicle, the two transmitting antennas and the first control device being integrated in the charging unit, and the two receivers and the second control device being integrated in the vehicle. The antenna 7 is the first transmitting antenna; the antenna 8 is the second transmitting antenna. The receiver 5 is the first receiver; the receiver 6 is the second receiver. The first control device 22 is included in the charging unit and forms the induction control device. The second control device 21 is included in the vehicle and forms the charging control device.

The second embodiment corresponds to the first embodiment, the two transmitters and the first control device being integrated in the vehicle, and the two receivers and the second control device being integrated in the charging unit. In this case, the transmitter and receiver from the first embodiment are transposed. In other words, according to FIG. 2, the antenna 5' from the first transmitter, and the antenna 6' forms the second transmitter. The receiver 7' is the first receiver; the receiver 8' is the second receiver. Analogously, the first control device 21', which operates the two transmitters, in the second embodiment, is the charging control unit included in the vehicle. The second control device 22', which operates the two receivers, is the induction control device included in the charging unit.

In the following, the first and the second embodiment will be described in the same manner. According to these embodiments, the charging control device comprises a first communication unit, and the induction control device comprises a second communication unit. Both communication units can exchange information signals in the high-frequency range in a preferred frequency band of the broadcast narrow-band radio at 433 MHz or 868 MHz. As an alternative, high-frequency bands in the GHz range can also be used, for example, according to WLAN or Bluetooth standards. In particular, these information signals are coded, so that a signal transmitted by a communication unit can be unambiguously assigned to the latter. Both communication units can send and receive information signals.

In order to establish the charging position according to the first embodiment or according to the second embodiment, a basic communication is to be established first between the two communication units and thereby between the vehicle and the charging unit. For this purpose, at least one communication unit sends out, at regular intervals of fewer than 10 seconds, a coded high-frequency search signal with a searching range of up to 100 meters with respect to the sensitivity threshold of the receiving communication unit. As an alternative, the interval of the sending of the search signal is inversely proportionally linked with the speed of the vehicle. As soon as the receiving communication unit receives the search signal, the communication unit receiving the search signal sends out a coded confirmation signal with a range that corresponds to the searching range, to the communication unit sending the search signal. Provided that the confirmation signal is received by the communication unit sending the search signal, the basic communication between the communication units is established, and the vehicle is situated with respect to the charging unit at least within a distance that is no greater than the searching range. The communication unit of the charging station will send no signals if the charging station is not available for a charging operation, for example, when it is used by another vehicle. The vehicle will therefore at first be in a so-called rough position with respect to a charging unit currently usable for the charging.

In the rough position, the basic communication connection exists between the vehicle and the charging unit by means of the two communication units. As a result of the coding of the search signal and the confirmation signal, it is guaranteed that the communication between the vehicle and the charging unit is unambiguous and the vehicle as well as the charging can in each case be alternatingly unambiguously identified. This means that if, for example, there are several charging units of the same type for several vehicles having the same type of architecture, a communication exists between a specific vehicle of these several vehicles and a specific charging unit of these several charging units, and this specific vehicle is in a rough position with respect to the specific charging unit.

When the basic communication is established in the rough position, additional information can be exchanged between the two communication units. In particular, the positioning of the vehicle can be initialized by means of triangulation. For the initialization, the charging control device can direct an inquiry to the driver of the vehicle by way of a suitable human-machine interface (MMS) as to whether the establishment of the charging position with respect to the charging unit, with which there is basic communication, is to take place. If this is confirmed by the driver of the vehicle in a suitable manner, which is not the object of this document, the positioning of the vehicle will be initialized by triangulation.

According to the first embodiment, the initialization is the triggering of the transmitters by the induction control device and the triggering of the receivers by the charging control device as well as a connection establishment of the transmitters with the receivers in the low-frequency range. In this case, the signal emitted by the transmitters is coded in order to ensure an unambiguous assignment between the transmitters and receivers, i.e. between the vehicle and the charging unit. This can be made possible, for example, by an 8-bit coding.

Correspondingly, according to the second embodiment, the initialization is the triggering of the transmitters by the charging control device and the triggering of the receivers by the induction control device.

It is also conceivable that the initialization is based on a simplified mutual recognition of the vehicle and the charging unit when a specific vehicle and a specific charging unit are fixedly coupled with one another, which a person skilled in the art knows as pairing.

After the initialization, the actual location determination will take place by triangulation. For this purpose, the transmitters each send out an electromagnetic signal of defined field intensity, which is called a positioning signal. The range of the positioning signal exceeds the searching range. The positioning signal of the first transmitter 7 is called a first positioning signal. The positioning signal of the second transmitter 6 is called a second positioning signal.

As a result of the installation position of the transmitters in the induction charging unit, the magnetic field vector of the positioning signals in each case oscillates along a specific spatial preferred axis, and the magnetic field has a preferred propagation direction. According to this embodiment, without any limitation of generality, the preferred axis is situated in a first approximation perpendicular to the x-y plane of the vehicle-related coordinate system known to the person skilled in the art of the vehicle situated in the rough position and the propagation direction in the x-y plane of the vehicle situated in the rough position.

The receivers in the vehicle unit have such an installation position that the receivers along the axis, which corresponds to the x-axis of the vehicle-related coordinate system of the vehicle situated in the rough position have the highest reception sensitivity with respect to a magnetic field and therefore the highest measuring precision.

As an alternative, three-dimensional transmitters and receivers can also be used. This means that the transmitters have a three-dimensional emission characteristic, and the receivers have a three dimensional receiving characteristic. The following one-dimensional approach can analogously be applied to additional dimensions in the case of a three-dimensional emission characteristic and a three-dimensional reception characteristic.

Without limiting generality, in the following, one-dimensional transmitters and one-dimensional receivers are used as the basis. The field intensity of the first positioning signal and thus the amount of a first magnetic field vector $H_1$ is unambiguously defined by a first transmitter current $I_1$, by a first winding number $N_1$ as well as by the radius $r_1$ of the first transmitter. The field intensity of the second positioning signal and thus the amount of a second magnetic field vector $H_2$ is unambiguously defined by a second transmitter current $I_2$, by a first winding number $N_2$ as well as by the radius $r_2$ of the second transmitter.

The two receivers are installed at a distance L in the vehicle, which distance is perpendicularly oriented on the longitudinal vehicle axis 10 and along a parallel 9 of the transverse vehicle axis.

The first receiver detects the first magnetic field vector $H_1$ at the location of the first receiver. The charging control device evaluates the receiver and detects a measuring signal $H_{1,x1}$, which indicates the field intensity of the first magnetic field at the location of the first receiver with respect to the x-direction in the vehicle coordinate system.

The second receiver detects the first magnetic field vector $H_1$ at the location of the second receiver. The charging control device evaluates the second receiver and detects a measuring signal $H_{1,x2}$, which indicates the field intensity of the first magnetic field at the location of the second receiver with respect to the x-direction in the vehicle coordinate system.

The first receiver detects the second magnetic field vector $H_2$ at the location of the first receiver. The charging control device evaluates the receiver and detects a measuring signal $H_{2,x1}$, which indicates the field intensity of the second magnetic field at the location of the first receiver with respect to the x-direction in the vehicle coordinate system.

The second receiver detects the second magnetic field vector $H_2$ at the location of the second receiver. The charging control device evaluates the second receiver and detects a measuring signal $H_{2,x2}$, which indicates the field intensity of the second magnetic field at the location of the second receiver with respect to the x-direction in the vehicle coordinate system.

At a specified point in time $t_1$, the time-dependent measuring signals are acquired as $H_{1,x1}(t_1)$, $H_{1,x2}(t_1)$, $H_{2,x1}(t_1)$ and $H_{2,x2}(t_1)$ and are processed by the charging control device or transmitted to the induction control device and processed by the induction control device. In the case of this signal processing, the position of the vehicle at the point in time t1 is detected by triangulation.

The length $d_1$, which describes the distance between the first transmitter and the first receiver is obtained as:

$$d_1(t_1) = \sqrt{-r^2 + \left(\frac{2H_{1,x1}(t_1)}{N_1 I_1 r_1^2}\right)^{\frac{2}{3}}}$$

The length $e_2$, which describes the distance between the first transmitter and the second receiver, is obtained as:

$$e_2(t_1) = \sqrt{-r_1^2 + \left(\frac{2H_{1,x2}(t_1)}{N_1 I_1 r_1^2}\right)^{\frac{2}{3}}}$$

The angle $\alpha 1$ between the length $d_1$ and the length L, is obtained as:

$$\alpha_1(t_1) = \arccos\left(\frac{e_2(t_1)^2 - d_1(t_1)^2 - L^2}{-2d_1(t_1)L}\right)$$

As a result of the determination of $d_1$, $e_2$, and $\alpha_1$ at the point in time $t_1$, the location position of the vehicle relative to the charging unit is unambiguously determined.

Further variables can be detected by means of triangulation. The length $d_2$, which describes the distance between the second transmitter and the first receiver, is obtained as:

$$d_2(t_1) = \sqrt{-r_2^2 + \left(\frac{2H_{2,x1}(t_1)}{N_2 I_2 r_2^2}\right)^{\frac{2}{3}}}$$

The length $e_1$, which describes the distance between the second transmitter and the first receiver, is obtained as:

$$e_1(t_1) = \sqrt{-r_2^2 + \left(\frac{2H_{2,x1}(t_1)}{N_2 I_2 r_2^2}\right)^{\frac{2}{3}}}$$

The angle $\alpha_2$ between the length $d_2$ and the length L is obtained as:

$$\alpha_2(t_1) = \arccos\left(\frac{e_1(t_1)^2 - d_2(t_1)^2 - L^2}{-2d_2(t_1)L}\right)$$

The signal processing further comprises the calculation of a travel trajectory of the vehicle, along which travel trajectory, starting from the location position of the vehicle, at the point in time $t_1$, the vehicle can be moved into the charging position. The calculation of the travel trajectory will not be described here in detail.

Starting from the point in time $t_1$, at a repetition rate of at least 10 Hz, the position of the vehicle at later points in time $t_n$ is determined, and the travel trajectory is updated starting from the location position of the vehicle at the point in time $t_n$.

Figure 3:
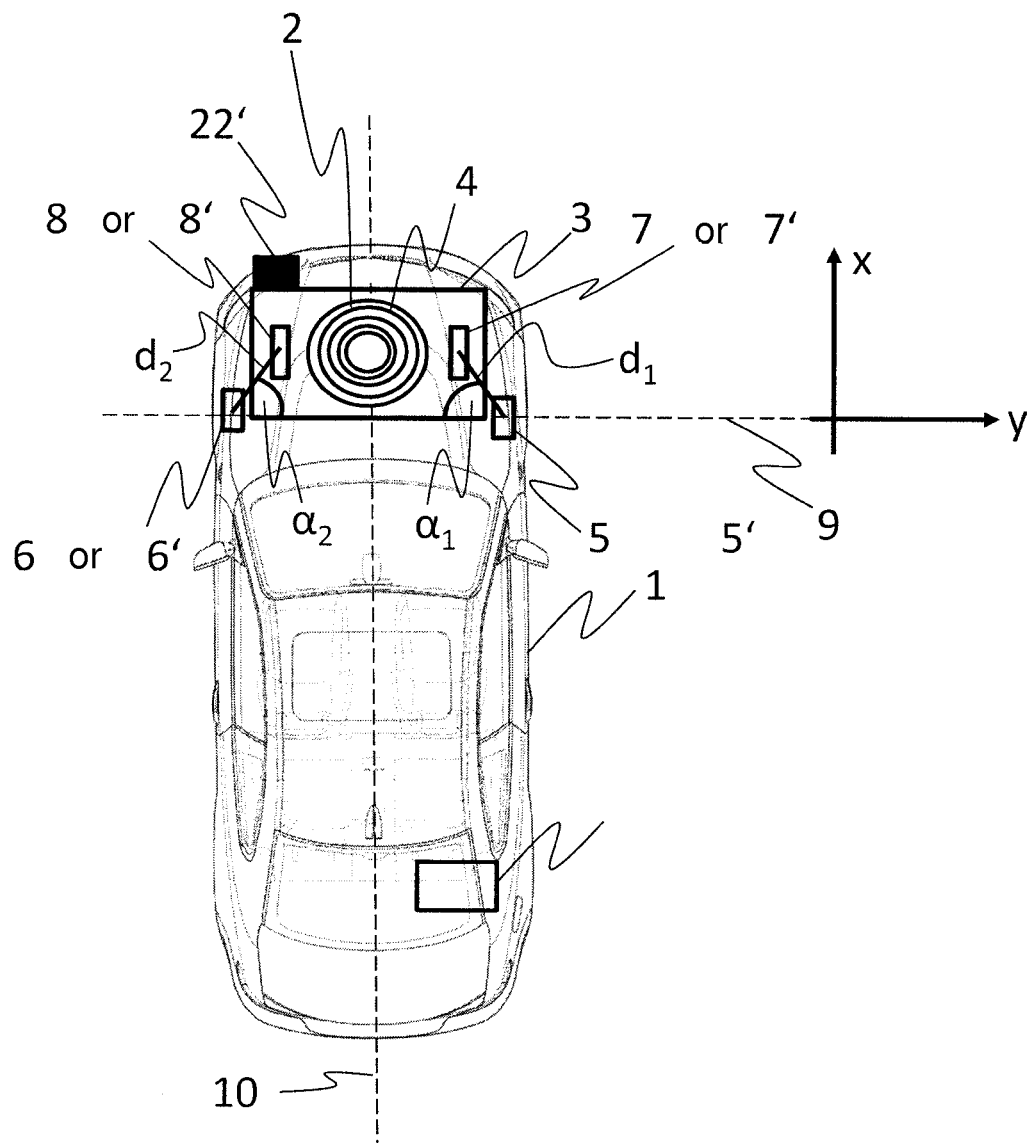
FIG. 3 is a schematic view of an established charging position by positioning according to FIG. 1 or FIG. 2.

FIG. 3 illustrates the charging position for the first embodiment and for the second embodiment. In the charging position, the charging position is established by the described arrangement of the transmitters and the receivers respectively in the charging unit, and the arrangement of the receivers and the transmitters respectively in the vehicle, when the length $d_1$ between the first transmitter and the first receiver describes the same distance as the length $d_2$ between the second transmitter and the second receiver. This same distance corresponds to a specified desired distance d, which describes the setting of the charging position. Furthermore, the two angles $\alpha_1$ and $\alpha_2$ correspond to a specified desired angle $\alpha$, which also describes the setting of the charging position. As a result of the axially symmetrical arrangement of the transmitters and of the receivers when the charging position is established with respect to the longitudinal axis of the vehicle, the charging position is described by $d=d_1=d_2$ and $\alpha=\alpha_1=\alpha_2$. In the case of a different type or geometrical arrangement of the transmitters and receivers, other desired angles will correspondingly occur for α1 and α2 as well as other desired distances for $d_1$ and $d_2$.

In contrast to the second embodiment, the first embodiment has the special advantage that the transmitting antennas are situated in the charging unit and the receivers are situated in the vehicle. As a result of the higher installation space requirement of a low-frequency transmitter in comparison to a low-frequency receiver, it is advantageous to integrate the low-frequency transmitters in the charging unit in order to implement a more cost-effective and space-saving integration in the vehicle, while the installation space available in the vehicle is usually limited.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system comprising a vehicle and an induction charging unit, the induction charging unit comprising a primary coil and the vehicle comprising a secondary coil and wherein, during a charging operation in a charging position, electric power is inductively transmissible from the primary coil to the secondary coil, in the charging position, the secondary coil being situated in a preferred spatial position area with respect to the primary coil, wherein, for setting the charging position,
    wherein the system is configured to measure a plurality of magnetic field vectors generated by a corresponding plurality of antennas and, based on measured intensities of the plurality of magnetic field vectors, the system iteratively detects a location position by means of triangulating the plurality of antennas, wherein the location position describes a time-dependent spatial position of the secondary coil with respect to the primary coil, and
    based on the iteratively-detected location position and the charging position, the system iteratively detects a travel trajectory, along which the location position of the charging position is approximated.

2. The system according to claim 1, wherein, for the plurality of antennas,
    the vehicle has at least two low-frequency receiving antennas, and
    the induction charging unit has at least two low-frequency transmitting antennas.

3. The system according to claim 1, wherein, for the plurality of antennas,
    the vehicle has at least one low-frequency receiving antenna, and
    the induction charging unit has at least two low-frequency transmitting antennas.

4. The system according to claim 1, wherein, for the plurality of antennas,
    the vehicle has at least two low-frequency receiving antennas, and
    the induction charging unit has at least one low-frequency transmitting antenna.

5. The System according to claim 1, wherein, for the plurality of antennas,
    the vehicle has at least two low-frequency transmitting antennas, and
    the induction charging unit has at least two low-frequency receiving antennas.

6. The system according to claim 1, wherein, for the plurality of antennas,
    the vehicle has at least one low-frequency transmitting antenna, and
    the induction charging unit has at least two low-frequency receiving antennas.

7. The system according to claim 1, wherein, for the plurality of antennas,
    the vehicle has at least two low-frequency transmitting antennas, and
    the induction charging unit has at least one low-frequency receiving antenna.

8. The system according to claim 3, wherein
    the vehicle has a charging control device,
    the charging control device comprises a first high-frequency communication unit, and
    the charging control device is assigned to the at least one low-frequency receiving antenna as a measuring unit for the plurality of magnetic field vectors of the at least one low-frequency receiving antenna.

9. The system according to claim 8, wherein
    the induction charging unit has an induction control device,
    the induction control device comprises a second high-frequency communication unit, and
    the induction control device drives the at least one low-frequency transmitting antenna.

10. The system according to claim 5, wherein
    the vehicle has a charging control device,
    the charging control device drives at least one of the low-frequency transmitting antennas, and
    the charging control device comprises a first high-frequency communication unit.

11. The system according to claim 10, wherein
    the induction charging unit has an induction control device,
    the induction control device comprises a second high-frequency communication unit, and
    the induction control device is assigned to at least one of the low-frequency receiving antennas as a measuring unit for the plurality of magnetic field vectors of the at least one low-frequency receiving antenna.

12. The system according to claim 8, wherein
    induction signals, corresponding to the plurality of magnetic field vectors of the at least one low-frequency receiving antenna, can be transmitted between the induction control device and the charging control device, and
    the charging control device or the induction control device, as the arithmetic unit, by means of the induction signals, detects the location position by triangulation.

13. The system according to claim 11, wherein
    induction signals, corresponding to the plurality of magnetic field vectors of the at least one low-frequency receiving antenna, can be transmitted between the induction control device and the charging control device, and
    the charging control device or the induction control device, as the arithmetic unit, by means of the induction signals, detects the location position by triangulation.

14. The system according to claim 12, wherein
    by means of the location position, the charging control device or the induction control device or a further control device of the vehicle detects the travel trajectory, and
    the vehicle automatically carries out a driving maneuver corresponding to the travel trajectory or the vehicle informs a driver of the vehicle by way of a suitable human-machine interface concerning a driving maneuver corresponding to the travel trajectory.

* * * * *